United States Patent [19]

Mazurek

[11] Patent Number: 4,693,935

[45] Date of Patent: Sep. 15, 1987

[54] POLYSILOXANE-GRAFTED COPOLYMER PRESSURE SENSITIVE ADHESIVE COMPOSITION AND SHEET MATERIALS COATED THEREWITH

[75] Inventor: Mieczyslaw H. Mazurek, Roseville, Minn.

[73] Assignee: Minnesota Mining and Manufacturing Company, St. Paul, Minn.

[21] Appl. No.: 864,517

[22] Filed: May 19, 1986

[51] Int. Cl.$^4$ ............................................... C09J 7/02
[52] U.S. Cl. ...................... 428/352; 428/354; 428/906; 427/208; 525/283; 525/288; 526/279
[58] Field of Search .................. 428/352, 354, 906; 427/208; 525/288, 283; 526/279

[56] References Cited

U.S. PATENT DOCUMENTS

| | | | |
|---|---|---|---|
| 24,906 | 12/1960 | Ulrich | 206/59 |
| 3,314,838 | 4/1967 | Erwin | 156/71 |
| 3,331,729 | 7/1967 | Danielson et al. | 161/162 |
| 3,413,168 | 11/1968 | Danielson et al. | 156/71 |
| 3,554,835 | 1/1971 | Morgan | 156/234 |
| 3,650,812 | 3/1972 | Nordstrom et al. | 525/288 |
| 3,786,116 | 1/1974 | Milkovich et al. | 260/885 |
| 3,842,059 | 10/1974 | Milkovich et al. | 260/93.5 A |
| 4,054,697 | 10/1977 | Reed et al. | 428/40 |
| 4,151,319 | 4/1979 | Sackoff et al. | 428/40 |
| 4,346,189 | 4/1982 | Laurent | 524/267 |
| 4,556,595 | 12/1985 | Ochi | 428/143 |

FOREIGN PATENT DOCUMENTS

| | | |
|---|---|---|
| 58-154766 | 9/1983 | Japan. |
| 58-167606 | 10/1983 | Japan. |
| 59-78236 | 5/1984 | Japan. |
| 59-126478 | 7/1984 | Japan. |
| 1541311 | 2/1979 | United Kingdom. |

OTHER PUBLICATIONS

Polymer Bulletin 7, 289–294 (1982), Y. Yamashita et al.
Polymer Bulletin 10, 368–372 (1983), Y. Yamshita et al.
Macromolecules 18, (1985) 580–582, Y. Yamashita et al.
Polymer Journal, vol. 14, No. 11, pp. 913–917 (1982) Yamashita et al.
Makromol, Chem. 185, 9–18 (1984) Yamashita et al.
ACS Polymer Preprints 25 (1), 245 (1984).
Block Copolymers, pp. 13–16, Academic Press, New York (1977) Noshay and McGrath.
J. F. Rabak's Experimental Methods in Polymer Chemistry, Wiley and Sons, 1981, Chapter 3 entitled "Molecular Weight Averages", pp. 57–61.

Primary Examiner—Melvyn I. Marquis
Attorney, Agent, or Firm—Donald M. Sell; James A. Smith; Richard Francis

[57] ABSTRACT

This invention provides pressure sensitive adhesive (PSA) compositions comprising a copolymer having a vinyl polymeric backbone having grafted thereto polysiloxane moieties. The compositions may contain other ingredients such as tackifier and/or plasticizer. An exposed surface of the PSA composition is initially positionable on a substrate to which it will be adhered but, once adhered, builds adhesion to form a strong bond. The PSA compositions may be used alone or in blends with unsiliconized PSA compositions. The invention also provides sheet materials coated with the PSA composition such as tape, labels, etc.

21 Claims, No Drawings

POLYSILOXANE-GRAFTED COPOLYMER PRESSURE SENSITIVE ADHESIVE COMPOSITION AND SHEET MATERIALS COATED THEREWITH

TECHNICAL FIELD

This invention relates to pressure sensitive adhesive compositions comprising a copolymer having a vinyl polymeric backbone with grafted pendant siloxane polymeric moieties and to sheet materials coated therewith.

BACKGROUND ART

Pressure sensitive adhesives and adhesive-coated sheet materials are well-known in the art as having the ability to adhere to adhesive-receptive surfaces on mere contact. Such coated sheets in the form of labels and tapes, for example, can be adhered to various substrates under very light "finger pressure" and can later be removed therefrom by stripping the sheet from the surface to which it is attached. Such sheets cannot, however, be slid around on the surface of the substrate with the adhesive coating in contact with the substrate because of the inherent "quick-grab" properties (i.e., high initial adhesion strength) of conventional pressure sensitive adhesive (PSA) compositions.

The precise positioning of PSA-coated sheet materials is extremely difficult if not impossible to achieve, even immediately after their initial application to the substrate. This problem is particularly apparent in the case of decorative sheets where the matching of patterns on adjacent sheets is required. Folds, wrinkles, and bubbles may also appear and are often difficult to remove because of the high initial adhesion of the PSA. In addition, the inherently narcissistic character (i.e., property of "self-stickiness") of PSAs can cause problems when the sheet is folded on itself to cause areas of the PSA coating to be accidentally brought together. Attempts to pull the adhered areas apart often result in discontinuities due to removal of areas of the PSA coating. Torn, stretched, or wrinkled areas of the facing sheet can also result.

It is therefore often desirable to reduce the initial affinity of a PSA for a substrate while still maintaining sufficient ultimate adhesion (after pressure bonding). The prior art has attempted to achieve this result in various ways, mainly by use of different types of "physical spacers" which have been mixed with or coated on the surface of the PSA. Such spacers act to hold the adhesive slightly away from the substrate surface until the desired placement has been achieved. For example, U.S. Pat. Nos. 3,314,838, 3,331,729, and 3,413,168, all assigned to the present assignee, disclose the use of hollow, spheroidal particles or microballoons composed of glass, urea- or phenol-formaldehyde resins, etc., to decrease initial adhesion and thereby provide positionability. The microballoons are described as being crushable or collapsible under applied hand pressure, thereafter enabling the PSA to contact and adhere to the surface of the substrate. Fragments of the collapsed or crushed microballoons may, however, remain on the bonding surface of the adhesive rather than completely dispersed into the adhesive layer, and this may, at least initially, adversely affect the adhesion strength.

In U.S. Pat. Nos. 4,054,697 (Imperial Chemical Industries Limited) and 4,556,595 (Nippon Carbide Kogyo Kabushiki Kaisha), positionability is obtained via the use of non-adhesive, solid particles as "physical spacers". The former patent utilizes resilient particles of natural or synthetic rubber (or blends thereof) or a foamed organic polymeric material such as polyurethane. Once positioned, the PSA-coated sheet material of this invention is again adhered to the surface of a substrate via the application of hand pressure. This serves to deform (rather than to crush or collapse) the particles on the surface of the PSA to such an extent as to bring the adhesive and the substrate into fuller contact. Use of the resilient, solid particles eliminates potential problems due to particle fragments on the adhesive surface, but the potential for "particle recovery" puts constraints on the PSA. Only those PSAs which prevent the deformed particles from recovering to their undeformed dimensions are acceptable, as such recovery will result in reduced adhesion to the substrate. The former patent ('697) states that, in practice, it may be desirable for the PSA to be curable after pressure bonding to the substrate surface, in order to overcome any tendency of the deformed particles to recover. The latter patent ('595) describes the use of non-adhesive, solid particles (of either inorganic or organic materials) having an average diameter smaller than the thickness of the adhesive layer, so that pressure bonding acts to force the particles to move away from the PSA surface and become dispersed or embedded in the bulk PSA. As with any use of a "physical spacing means" to provide positionability, an additional manufacturing step is required in order to distribute the particles or spacers of choice.

Silicone has also been used as a spacing material to reduce the initial adhesion of PSA coatings and thereby produce positionable products. For example, U.S. Pat. No. 3,554,835 (Morgan Adhesives Company) discloses a method of making and using a "slidable" PSA-coated laminate which relies upon "dots" of silicone or other conventional release material as non-adhesive spacers to enable initial positioning of the laminate on a substrate. Similarly, United Kingdom Pat. No. 1,541,311 (United Merchants and Manufacturers, Inc.) describes a PSA-coated laminate where positionability is provided by a uniform and discontinuous surface coating in the form of small beads or droplets of a non-tacky polysiloxane or polysiloxane-polyoxyalkylene block copolymer. Both teachings require an additional manufacturing step or steps to apply the silicone spacing material and to then effect solvent removal, drying, or curing.

In U.S. Pat. No. 4,151,319 (United Merchants and Manufacturers, Inc.) a method for making a positionable PSA-coated laminate is disclosed whereby polysiloxane or polysiloxane-polyoxyalkylene block copolymer is intimately mixed with the PSA itself rather than forming a coating on the PSA surface. "Pre-mixing" of a siloxane polymer or copolymer in a suitable solvent prior to incorporation into the adhesive is recommended. Again, the required mixing or dispersing and the recommended pre-mixing contribute additional process steps. The siloxane additives of this teaching are said to be in the form of small beads or droplets dispersed throughout the adhesive mass, and thus some of the droplets are positioned at the adhesive/release sheet interface of the laminate (i.e., at the PSA surface) and function to allow initial positioning on a substrate. None of the aforementioned patents utilizes chemically incorporated siloxane polymers or copolymers, and, therefore, uncontrolled loss of the non-adhesive polymeric siloxane materials to the release sheet could occur, especially upon storage and aging prior to use. The use of either block copolymers or high molecular weight (above 25,000) polysiloxanes is suggested in United Kingdom Pat. No. 1,541,311 and U.S. Pat. No. 4,151,319 to minimize such loss, but the resultant laminates still may not offer predictable levels of positionability even with minor losses.

U.S. Pat. No. 4,346,189 (Morgan Adhesives Company) describes the use of polysiloxane additives (of up to about 10,000 molecular weight) in a different type of application. The silicones are mixed with tackified, synthetic rubber-based PSA compositions to reduce edge ooze or flow upon cutting of sheets coated with such compositions. Either non-reactive or reactive polysiloxanes can be utilized and are said to appear to adsorb or graft onto other ingredients of the adhesives or take other unknown actions so as to produce the desired effect. It is stated, however, that the silicones can be added even at relatively high concentrations (6 to 10% solids) without adversely affecting the adhesive characteristics of the material.

Graft copolymers, some containing silicone, are being increasingly used for general modification of surface properties, as is described in a series of papers by Y. Yamashita et al., [Polymer Bulletin 7, 289 (1982); Polymer Bulletin 10, 368 (1983); Makromol. Chem. 185, 9 (1984); Macromolecules 18, 580 (1985)]. Such use is also reflected in some recent Japanese art, such as Japanese Patent Application No. 57-179246, published Nov. 4, 1982, which concerns the use of graft copolymers as additives to impart long-lasting hydrophobicity (or hydrophilicity) to surfaces. In Japanese Patent Applications Nos. 58-167606, published Oct. 3, 1983, and 58-154766, published Sept. 14, 1983, a method of preparation of silicone graft copolymers and the use of these copolymers in coating compositions such as paint films are described. Here, the copolymers are said to provide long-lasting water- and oil-repellency, stain resistance, and reduced frictional properties. Japanese Patent Application No. 59-78236, published May 7, 1984, discloses a method of preparing monofunctional polymeric silicone monomers, i.e., macromonomers, for use in the preparation of graft copolymers as surface-treatment agents. The use of such silicone macromonomer-grafted copolymers in coating compositions, again to impart lasting water- and oil-repellency, stain resistance, and low friction characteristics, is described in Japanese Patent Application No. 59-126478, published July 21, 1984. Pending U.S. patent application Ser. No. 757,278, filed on July 19, 1985, assigned to the present consignee, discloses the use of tack-free polysiloxane-grafted copolymers (and blends thereof with other polymeric materials) as release coating compositions for PSA-coated sheet materials and the back side of PSA-coated tapes.

We are unaware of any art, however, which teaches the use of chemically tailored, tacky or tackified, polysiloxane-grafted copolymers as temporarily positionable pressure sensitive adhesives for controlled initial adhesion applications.

SUMMARY OF THE INVENTION

The present invention provides a pressure-sensitive adhesive composition which comprises a copolymer which has pendant polysiloxane grafts which cause the exposed surface of a layer of the adhesive composition to initially have a lower degree of adhesiveness to provide in effect a temporary "low adhesion frontsize". Upon application, however, the pendant polysiloxane grafts appear to migrate into the body of the layer and the adhering surface builds adhesiveness to form a strong adhesive bond. Thus a temporary chemical surface modification of the pressure-sensitive adhesive composition is effected such that positionability of an article bearing the coating of pressure-sensitive adhesive is possible without many of the aforementioned difficulties of the prior art. The invention utilizes copolymers wherein the number and the molecular weight of polysiloxane grafts may vary widely so that the initial adhesion of the adhesive coating can vary over a broad range of values.

Chemical incorporation of the polysiloxane prevents siloxane loss. Predictable degrees of positionability are thus reliably achieved for a variety of PSA compositions, without the need for an additional process step for application of a spacing material as required by certain disclosures of the prior art. Low initial peel adhesion values and non-narcissistic behavior are observed even for the siliconization of highly aggressive PSAs (i.e., PSAs with peel adhesion values in the range of 60-100 plus N/100 mm). Notwithstanding the presence of the polysiloxane grafts, it has been found that the adhesion of the adhesive compositions of the invention builds with time to values approaching those of control materials containing no siloxane.

The PSA composition of this invention comprises a vinyl copolymer which is inherently tacky at the use temperature or which can be tackified, as known in the art, via the addition of a compatible tackifying resin and/or plasticizer. (Here and throughout, the term "vinyl" is used in its broadest sense wherein "vinyl monomer" refers to substituted ethylene. Such terminology is common, as described for example by Odian in *Principles of Polymerization*, Second Edition, John Wiley & Sons, New York, 1981.) The backbone of the copolymer has grafted to it monovalent siloxane polymeric moieties having a number average molecular weight above about 500 (preferably from about 500 to about 50,000, most preferably from about 5,000 to about 25,000). The number and composition of the grafted siloxane polymeric moieties in the copolymer is such as to provide the PSA composition with a decrease (preferably of at least 20%) in the initial peel adhesion value relative to that of a control composition wherein the polysiloxane grafts are absent.

More specifically, the PSA composition of the invention comprises the following elements:

a. the copolymer which comprises repeating A, C, and, optionally, B monomers wherein:

A is at least one free radically polymerizable vinyl monomer;

when used, B is at least one reinforcing monomer copolymerizable with A, the amount by weight of B monomer being up to about 20% of the total weight of all monomers; and C is a monomer having the general formula $$X(Y)_n Si(R)_{3-m} Z_m$$

wherein

X is a vinyl group copolymerizable with the A and B monomers;

Y is a divalent linking group;

n is zero or 1;

m is an integer of from 1 to 3;

R is hydrogen, lower alkyl (e.g., methyl, ethyl, or propyl), aryl (e.g., phenyl or substituted phenyl), or alkoxy;

Z is a monovalent siloxane polymeric moiety having a number average molecular weight above about 500 and is essentially unreactive under copolymerization conditions; wherein the monomers are copolymerized to form the polymeric backbone with the C monomer grafted thereto and wherein the amount and composition of C monomer in the copolymer is such as to provide the PSA composition with a decrease (preferably of at least 20%) in the initial peel adhesion value relative to that of a control composition wherein the polysiloxane grafts are absent;

b. up to about 150 parts of a compatible tackifying resin per 100 parts copolymer; and c. up to about 50 parts of a compatible plasticizer per 100 parts copolymer.

This invention also provides coated sheet material comprising a backing member and a PSA coating comprising the PSA composition of the invention covering at least a portion of one major surface thereof. The invention also provides specific products comprising the coated sheet material such as a roll of tape comprising a flexible backing sheet having at least one major surface coated with the PSA of the invention. Another product of the invention is a transfer tape comprising a film of the PSA composition of the invention between two release liners. The PSA coating or film may comprise the PSA composition of the invention alone, or it may be blended with a different compatible PSA composition, for example, one known in the prior art, which need not contain silicone. Such a blend would provide a means to make commercially available PSA positionable.

DETAILED DESCRIPTION OF THE INVENTION

The copolymers of the invention have a well-defined structure, having a vinyl polymeric backbone which has been chemically modified by the addition of a small weight percentage of polysiloxane grafts. When such copolymers (or PSA compositions containing such copolymers) are coated on a sheet material or backing, a siliconized surface develops on exposure to a low surface energy surface such as air, and this provides for low initial peel adhesion values from both low and high energy substrate surfaces. Once applied to a surface, adhesion builds with time to values approaching those of control materials containing no siloxane. Upon removal after a substantial residence time, the low initial peel adhesion surface will regenerate.

The surface characteristics of the copolymeric adhesive composition can be chemically tailored through variation of both the molecular weight of the grafted siloxane polymeric moiety and the total siloxane content (weight percentage) of the copolymer, with higher siloxane content and/or molecular weight providing lower initial adhesion, i.e., a greater degree of positionability. The chemical nature and the molecular weight of the vinyl polymeric backbone of the copolymer can also be chosen such that the rate of adhesion build and the ultimate level of adhesion to the substrate can be matched to the requirements of a particular application. Longer-term positionability may thus be achieved if so desired. Since their siloxane content is relatively low, the copolymers of this invention are readily compatible with siloxane-free polymers for example polymers of composition similar to that of the vinyl backbone. Thus, if blending of the copolymer with an unsiliconized PSA is desired, a backbone composition similar or identical to the chemical composition of the unsiliconized PSA may be selected so as to optimize compatibility and facilitate blending over a wide range of compositions.

The preferred method of preparation of the PSA compositions of this invention provides graft copolymer of high purity which can be coated directly from the polymerization solvent after tackification or plasticization, if necessary or desired. The resultant coatings do not require curing or crosslinking. However, if enhancement of either shear strength or resistance to solvents or photochemical or oxidative forces is desired, crosslinking may be effected by standard methods well-known in the art, such as radiation curing (electron beam or ultraviolet light) or chemical crosslinking.

The siloxane polymeric moieties can be grafted by polymerizing monomer onto reactive sites located on the backbone, by attaching preformed polymeric moieties to sites on the backbone, or, preferably, by copolymerizing the vinyl monomer(s), A, and, when used, reinforcing monomer(s), B, with preformed polymeric siloxane monomer, C. Since the polymeric siloxane surface modifier is chemically bound, it is possible to chemically tailor the PSA compositions of this invention such that a specific degree of positionability is provided and can be reproduced with consistency. The initial adhesion properties of even highly aggressive PSA coatings can be varied over a broad range of values in a controlled fashion, and the need for an additional process step or steps for application of a physical spacing material is eliminated.

As previously mentioned, the PSA composition of this invention comprises a vinyl copolymer which is inherently tacky at the use temperature or which can be tackified, as known in the art, via the addition of a compatible tackifying resin or plasticizer. Monovalent siloxane polymeric moieties having a number average molecular weight above about 500 are grafted to the copolymer backbone. The copolymer preferably consists essentially of copolymerized repeating units from A and C monomers and, optionally, B monomers according to the description given above.

The A monomer or monomers (there may be more than one) are chosen such that a tacky or tackifiable material is obtained upon polymerization of A (or A and B). Representative examples of A monomers are the acrylic or methacrylic acid esters of non-tertiary alcohols such as methanol, ethanol, 1-propanol, 2-propanol, 1-butanol, 2-methyl-1-propanol, 1-pentanol, 2-pentanol, 3-pentanol, 2-methyl-1-butanol, 1-methyl-1-butanol, 3-methyl-1-butanol, 1-methyl-1-pentanol, 2-methyl-1-pentanol, 3-methyl-1-pentanol, cyclohexanol, 2-ethyl-1-butanol, 3-heptanol, benzyl alcohol, 2-octanol, 6-methyl-1-heptanol, 2-ethyl-1-hexanol, 3,5-dimethyl-1-hexanol, 3,5,5-trimethyl-1-hexanol, 1-decanol, 1-dodecanol, 1-hexadecanol, 1-octadecanol, and the like, the alcohols having from 1 to 18 carbon atoms with the average number of carbon atoms being about 4-12, as well as styrene, vinyl esters, vinyl chloride, vinylidene chloride, and the like. Such monomers are known in the art, and many are commercially available. Preferred polymerized A monomer backbone compositions include poly(isooctyl acrylate), poly(isononyl acrylate), poly(isodecyl acrylate), poly(2-ethylhexyl acrylate), and copolymers of isooctyl acrylate, isononyl acrylate, isodecyl acrylate, or 2-ethylhexyl acrylate with other A monomer or monomers.

Representative examples of reinforcing monomer, B, are polar monomers such as acrylic acid, methacrylic acid, itaconic acid, acrylamide, methacrylamide, N,N-dimethylacrylamide, acrylonitrile, methacrylonitrile, and N-vinyl pyrrolidone. In addition, polymeric monomers or macromonomers (as will be described hereinafter) having a $T_g$ or $T_m$ above about 20° C. are also useful as reinforcing monomers. Representative examples of such polymeric monomers are poly(styrene), poly(α-methylstyrene), poly(vinyl toluene), and poly(methyl methacrylate) macromonomers. Preferred B monomers are acrylic acid, acrylamide, methacrylic acid, N-vinyl pyrrolidone, acrylonitrile, and poly(styrene) macromonomer. The amount by weight of B monomer preferably does not exceed about 20% of the total weight of all monomers such that excessive firmness to the PSA is avoided. Incorporation of B monomer to the extent of about 2% to about 15% by weight is most preferred and provides PSA of high cohesive or internal strength which also retains good adhesive properties.

The preferred C monomer may be further defined as having an X group which has the general formula

wherein $R^1$ is a hydrogen atom or a COOH group and $R^2$ is a hydrogen atom, a methyl group, or a CH$_2$COOH group.

The Z group of the C monomer has the general formula

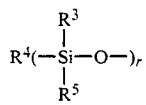

where $R^3$ and $R^5$ are independently lower alkyl, aryl, or fluoroalkyl, where lower alkyl and fluoroalkyl both refer to alkyl groups having from one to three carbon atoms and where aryl refers to phenyl or substituted phenyl. $R^4$ may be alkyl, alkoxy, alkylamino, aryl, hydroxyl, or fluoroalkyl, and r is an integer from about 5 to about 700. Preferably, the C monomer has a general formula selected from the group consisting of the following, where m is 1, 2 or 3, p is zero or 1, R" may be alkyl or hydrogen, q is an integer from 2 to 6, s is an integer from zero to 2, and X, R, and Z are as defined above:

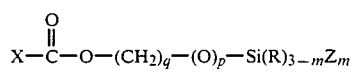
(a)

X—Si(R)$_{3-m}$Z$_m$;    (b)

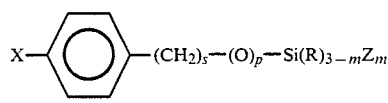
(c)

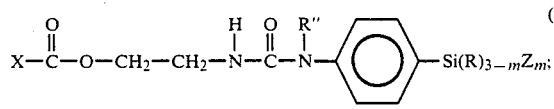
(d)

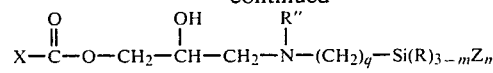
(e)

(f)

The PSA composition of this invention is provided by copolymerizing the A, C, and, preferably, B monomers followed, when necessary or desirable, by blending with a compatible tackifying resin and/or plasticizer in order to optimize the ultimate tack properties of the PSA. The use of such tack-modifiers is common in the art, as is described in the *Handbook of Pressure-Sensitive Adhesive Technology* edited by Donatas Satas (1982). Examples of useful tackifying resins include rosin, rosin derivatives, polyterpene resins, phenolic resins, coumarone-indene resins, and the like. Plasticizers which can be employed include the well-known extender oils (aromatic, paraffinic, or naphthenic), as well as a wide variety of liquid polymers. When used, tackifying resin is preferably added in an amount not to exceed about 150 parts per 100 parts copolymer, and plasticizer may be added in an amount up to about 50 parts per 100 parts copolymer. It is also within the scope of this invention to include various other components in the adhesive formulation. For example, it may be desirable to include such materials as pigments, fillers, stabilizers, or various polymeric additives.

When the above-described PSA composition is coated on a backing and applied to a substrate surface, low initial adhesion to the substrate is observed. The level of adhesion and, thus, the degree of positionability are related to both the molecular weight of C and its weight percentage in the copolymer. Copolymers containing C monomer having a molecular weight less than about 500 are not very effective in providing positionability. Copolymers containing C monomer having a molecular weight greater than 50,000 effectively provide positionability, but, at such high molecular weights, possible incompatibility of the C monomer with the remaining monomer during the copolymerization process may result in reduced incorporation of C. A C monomer molecular weight range from about 500 to about 50,000 is therefore preferred. A molecular weight range from about 5,000 to about 25,000 is most preferred.

The C monomer is preferably incorporated in the copolymer in the amount of about 0.01 to about 50% of the total monomer weight to obtain the desired degree of positionability. The amount of C monomer included may vary depending upon the particular application, but incorporation of such percentages of C monomer having a molecular weight in the above-specified range has been found to proceed smoothly and to result in material which provides effective positionability for a variety of applications while still being cost effective. In general, it is desirable to have a decrease (preferably of at least 20%) in the initial peel adhesion value relative to that of a control containing no siloxane. It is of course possible, however, that a person skilled in the art might wish, for a specific purpose, to decrease the percent reduction in the initial peel as compared to the control.

The total weight of B and C monomers is preferably within the range of about 0.01 to about 70% of the total weight of all monomers in the copolymer.

The C monomer and certain of the reinforcing monomers, B, of this invention are terminally functional polymers having a single functional group (the vinyl group) and are sometimes termed macromonomers or "macromers". Such monomers are known and may be prepared by the method disclosed by Milkovich et al., as described in U.S. Pat. Nos. 3,786,116 and 3,842,059. The preparation of polydimethylsiloxane macromonomer and subsequent copolymerization with vinyl monomer have been described in several papers by Y. Yamashita et al., [Polymer J. 14, 913 (1982); ACS Polymer Preprints 25 (1), 245 (1984); Makromol. Chem. 185, 9 (1984)]. This method of macromonomer preparation involves the anionic polymerization of hexamethylcyclotrisiloxane monomer ($D_3$) to form living polymer of controlled molecular weight, and termination is achieved via chlorosilane compounds containing a polymerizable vinyl group. Free radical copolymerization of the monofunctional siloxane macromonomer with vinyl monomer or monomers provides siloxane-grafted copolymer of well-defined structure, i.e., controlled length and number of grafted siloxane branches.

Suitable monomers for use in the above-mentioned anionic polymerization are, in general, diorganocyclosiloxanes of the formula

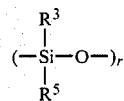

where $R^3$ and $R^5$ are as previously defined integer of 3 to 7. Preferred are the cyclic siloxanes where r is 3 or 4 and $R^3$ and $R^5$ are both methyl, these cyclic siloxanes being hereafter designated $D_3$ and $D_4$, respectively. $D_3$, which is a strained ring structure, is especially preferred.

Initiators of the anionic polymerization are chosen such that monofunctional living polymer is produced. Suitable initiators include alkali metal hydrocarbons such as alkyl or aryl lithium, sodium, or potassium compounds containing up to 20 carbon atoms in the alkyl or aryl radical or more, preferably up to 8 carbon atoms. Examples of such compounds are ethylsodium, propylsodium, phenylsodium, butylpotassium, octylpotassium, methyllithium, ethyllithium, n-butyllithium, sec-butyllithium, tert-butyllithium, phenyllithium, and 2-ethylhexyllithium. Lithium compounds are preferred as initiators. Also suitable as initiators are alkali metal alkoxides, hydroxides, and amides, as well as triorganosilanolates of the formula

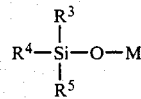

where M is alkali metal, tetraalkylammonium, or tetraalkylphosphonium cation and where $R^3$, $R^4$, and $R^5$ are as previously defined. The preferred triorganosilanolate initiator is lithium trimethylsilanolate (LTMS). In general, the preferred use of both strained cyclic monomer and lithium initiator reduces the likelihood of redistribution reactions and thereby provides siloxane macromonomer of narrow molecular weight distribution which is reasonably free of unwanted cyclic oligomers.

Molecular weight is determined by the initiator/cyclic monomer ratio, and thus the amount of initiator may vary from about 0.004 to about 0.4 mole of organometallic initiator per mole of monomer. Preferably, the amount will be from about 0.008 to about 0.04 mole of initiator per mole of monomer.

For the initiation of the anionic polymerization, an inert, preferably polar organic solvent can be utilized. Anionic polymerization propagation with lithium counterion requires either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene. The polar solvent serves to "activate" the silanolate ion, making propagation possible.

Generally, the polymerization can be carried out at a temperature ranging from about $-50°$ C. to about $100°$ C., preferably from about $-20°$ C. to about $30°$ C. Anhydrous conditions and an inert atmosphere such as nitrogen, helium, or argon are required.

Termination of the anionic polymerization is, in general, achieved via direct reaction of the living polymeric anion with halogen-containing termination agents, i.e., functionalized chlorosilanes, to produce vinyl-terminated polymeric monomers. Such terminating agents may be represented by the general formula $X(Y)_n Si(R)_{3-m} Cl_m$, where m is 1, 2, or 3 and where X, Y, n, and R have been previously defined. A preferred terminating agent is methacryloxypropyldimethylchlorosilane. The termination reaction is carried out by adding a slight molar excess of the terminating agent (relative to the amount of initiator) to the living polymer at the polymerization temperature. According to the aforementioned papers by Y. Yamashita et al., the reaction mixture may be ultrasonically irradiated after addition of the terminating agent in order to enhance functionality of the macromonomer. Purification of the macromonomer can be effected by addition of methanol.

The copolymerization of the A monomer, B monomer, if used, and C monomer is by conventional free radical polymerization such as described by Ulrich, U.S. Re. Pat. No. 24,906. The monomers are dissolved in an inert organic solvent and polymerized utilizing a suitable free radical initiator which can be either thermally or photochemically activated. Suitable thermally activated initiators include azo compounds such as 2,2'-azobis (isobutyronitrile), hydroperoxides such as tert-butyl hydroperoxide, and peroxides such as benzoyl peroxide or cyclohexanone peroxide, and suitable photochemically activated initiators include benzophenone, benzoin ethyl ether, and 2,2-dimethoxy-2-phenyl acetophenone. The amount of initiator used is generally about 0.01 to about 5% by weight of the total polymerizable composition.

The organic solvent used in the free radical copolymerization can be any organic liquid which is inert to the reactants and product and which will not otherwise adversely affect the reaction. Suitable solvents include ethyl acetate and mixtures such as ethyl acetate with toluene or heptane with toluene and isopropyl alcohol. Other solvent systems are useful. The amount of solvent is generally about 30–80% by weight of the total weight of reactants and solvent. In addition to solution polymerization, the copolymerization can be carried out by other well-known techniques such as suspension, emulsion, and bulk polymerization.

As described above, the preferred grafting technique involves copolymerization of vinyl monomer, A, reinforcing monomer, B, when used, and chemically tailored macromonomer, C, of controlled molecular weight. Other grafting techniques can be employed, each providing a degree of predictability of the properties of the end product. One alternative technique involves preforming the vinyl polymeric backbone, then copolymerizing this preformed backbone with cyclic siloxane monomer. Another approach is to graft preformed monofunctional siloxane polymer to a preformed vinyl polymeric backbone. These and other polymer grafting techniques are described by Noshay and McGrath in *Block Copolymers*, Academic Press, New York (1977), pages 13–16 and in greater detail by Battaerd and Tregear in *Graft Copolymers*, J. Wiley and Sons, New York (1967).

The copolymeric PSA compositions of this invention are easily coated upon suitable flexible or inflexible backing materials by conventional coating techniques to produce positionable PSA-coated sheet materials. The flexible backing may be of any material which is conventionally utilized as a tape backing or may be of any other flexible material. Representative examples of flexible tape backing materials include paper, plastic films such as poly(propylene), poly(ethylene), poly(vinyl chloride), polyester [e.g., poly(ethylene terephthalate)], cellulose acetate, and ethyl cellulose. Backings may also be of woven fabric formed of threads of synthetic or natural materials such as cotton, nylon, rayon, glass, or ceramic material, or they may be of nonwoven fabric such as air-laid webs of natural or synthetic fibers or blends of these. In addition, the backing may be formed of metal, metallized polymeric film, or ceramic sheet material. The PSA-coated sheet materials may take the form of any article conventionally known to be utilized with PSA compositions such as labels, tapes, signs, covers, marking indicia, and the like.

The PSA compositions of this invention may be coated by any of a variety of conventional coating techniques such as roll coating, knife coating, or curtain coating. The PSA compositions may also be coated without modification by extrusion, coextrusion, or hot-melt techniques by employing suitable conventional coating devices for this purpose. Primers may be used, but they are not always necessary.

EXAMPLES

The following detailed description includes exemplary preparations of vinyl-terminated polymeric monomer (C) and numerous copolymer adhesive compositions prepared with the various A, B, and C monomers. The A and B monomers are set forth hereinafter in Table I. The C monomers are identified as C-1 through C-6 and are described in specific detail in Table II. Examples 1–20 of pressure sensitive adhesive compositions made according to the present invention are set forth in Table III. Other numbered examples follow. All parts in the examples are by weight unless otherwise specified.

Definition of Terms

The number average molecular weight ($\overline{M}_n$), weight average molecular weight ($\overline{M}_w$), and Z-average molecular weight ($\overline{M}_z$) are well-known mathematical descriptions of the molecular weight distribution of a polymer sample.

The polydispersity is a measure of the molecular weight distribution of a polymer and is defined as $\overline{M}_w/\overline{M}_n$.

Each of the foregoing is a well-known term used by polymer chemists and others. Further explanation of the derivation of these terms may be found in J. F. Rabek's *Experimental Methods in Polymer Chemistry*, Wiley and Sons, 1981, Chapter 3 entitled "Molecular Weight Averages", pages 57–61.

Test Methods

The test method primarily used to evaluate the adhesive coated flexible sheet materials of the examples is the industry standard peel adhesion test used to evaluate PSA coated materials. The standard test is described in detail below and in various publications of the American Society for Testing and Materials (ASTM), Philadelphia, Pa. and the Pressure Sensitive Tape Council (PSTC), Glenview, Ill.

In some cases an aging test was done by leaving the PSA-coated substrate in contact with a glass plate for specified periods of time up to 2 days and monitoring the change in peel values under conditions of constant temperature and humidity.

A modification of the standard peel adhesion test was used to evaluate self-adhesiveness of the adhesive-coated materials, and this test is described in detail below. The reference source of the standard test method is also given.

Peel Adhesion

Reference: ASTM D3330-78 PSTC-1 (11/75)

Peel adhesion is the force required to remove a coated flexible sheet material from a test panel measured at a specific angle and rate of removal. In the examples, this force is expressed in Newtons per 100 mm (N/100 mm) width of coated sheet. The procedure follows:

1. A 12.7 mm width of the coated sheet is applied to the horizontal surface of a clean glass test plate with at least 12.7 lineal cm in firm contact. A hard rubber roller is used to apply the strip.
2. The free end of the coated strip is doubled back nearly touching itself, so the angle of removal will be 180°. The free end is attached to the adhesion tester scale.
3. The glass test plate is clamped in the jaws of the tensile testing machine which is capable of moving the plate away from the scale at a constant rate of 2.3 meters per minute.
4. The scale reading in Newtons is recorded as the tape is peeled from the glass surface. The data is recorded as the average value of the range of numbers observed during the test.

Self-Adhesiveness

Reference: Modification of ASTM D3330-78 PSTC-1 (11/75)

A quantitative measure of self-adhesiveness of the coating compositions reported herein is the force required to remove a flexible substrate coated with the composition studied from an immobile substrate coated with the same composition at a specific angle and rate of removal. This is a modification of the standard peel adhesion measurement. In the examples this force is expressed in Newtons per 100 mm (N/100mm) width of coated sheet. The procedure follows:

(1) A 300 mm width of substrate coated with the adhesive composition of interest was laminated with the coated surface up to the horizontal surface of a clean glass plate using double coated tape.

(2) A 12.7 mm width of substrate coated with the same adhesive composition was applied to the coated surface with at least 12.7 lineal cm in firm contact. A hard roller is used to apply the strip.

(3) The free end of the upper substrate coated with the adhesive composition is doubled back nearly touching itself, so the angle of removal will be 180°. The free end is attached to the adhesion tester scale.

(4) The glass plate is clamped in the jaws of a tensile testing machine which is capable of moving the plate away from the scale at a constant rate of 2.3 meters per minute.

(5) The scale reading in Newtons is recorded as the upper coated substrate is peeled from the immobile substrate coated with the same composition. The data is reported as the average value of the range of numbers observed during the test.

(6) A readhesion test is done by taking the upper coated substrate which has just been peeled from the lower coated substrate and adhering it again to the surface from which it has been peeled, then doing a peel test as in points (3) - (5).

(7) An aging test is carried out by leaving the substrate coated with adhesive composition in contact with the coated surface of the immobile substrate for specified periods of time up to 48 hours and monitoring the change in peel values under conditions of constant temperature and humidity.

Inherent Viscosity Measurements

The inherent viscosity of the copolymers was measured by conventional means using a Cannon-Fenske #50 viscometer in a water bath controlled at 25° C. to measure the flow time of 10 ml of a polymer solution (0.2 g of polymer per deciliter in ethyl acetate). The examples and control examples being run for comparison were run under identical conditions.

Gel Permeation Chromatography

The molecular weight distributions of the polymeric monomers and the adhesive coating compositions which utilize the polymeric monomers as pendant moieties were determined by conventional gel permeation chromatography (GPC).

A Hewlett-Packard Model 1084B, high performance liquid chromatograph equipped with one Ultragel column of size $10^7$ Å and four Ultra Styragel columns of size 10hu 5 Å, $10^4$ Å, 500 Å, and 100 Å was used for all determinations. Samples were dissolved in toluene and filtered through a 0.5 micrometer polytetrafluoroethylene filter. Samples were injected at volumes of 170 microliters to 200 microliters and eluted at a rate of 1 ml per minute through the columns maintained at 40° C. Toluene was used as the solvent. The differential refractometer detector was a Hewlett-Packard Model 79877A. The system was calibrated using polystyrene standards and employing a linear least squares fit. All GPC calculations were performed on a Hewlett-Packard Model 3388 integrator and all molecular weight averages are polystyrene equivalent molecular weights. The molecular weight averages and polydispersities were calculated according to accepted practices. GPC test methods are further explained in *Modern Size Exclusion Liquid Chromatography* by W. W. Yau, J. J. Kirkland, and D. D. Bly, John Wiley and Sons, 1979.

TABLE I

| Abbreviation | Compound |
|---|---|
| "A" Monomer | |
| IOA | Isooctyl acrylate |
| EA | Ethyl acrylate |
| IDMA | Isodecyl methacrylate |
| "B" Monomer | |
| AA | Acrylic acid |
| MAA | Methacrylic acid |
| NVP | N-vinyl-2-pyrrolidone |
| ACM | Acrylamide |
| PSM | Polystyrene macromonomer |

"C" Monomer Preparation

Polymeric vinyl-terminated monomer, identified in the claims and herein as the "C" monomer, is prepared as described below.

The "C" monomers are identified in the foregoing descriptions and in the tables as "C" Monomers "C-1" - "C-6". The specific details of the chemical type of initiation ("Initiator") and termination ("Termination"), the number average molecular weight (rounded to the nearest thousand) ("Molecular Weight"), and the polydispersity ("Polydispersity") are given in Table II.

Monomer "C-1"

A methacrylate-terminated polydimethylsiloxane polymeric monomer having an average molecular weight of about 24,000 was prepared. A 100 ml, two-necked flask was fitted with a vacuum ampoule closed with a Rotaflo ® stopcock in one neck and with a Rotaflo ® stopcock connected to the other neck. The flask was flamed on the vacuum line and charged with 22.2 g (0.10 mole) of hexamethylcyclotrisiloxane (D$_3$) and about 60 ml of THF. The vacuum ampoule contained 0.089 g (0.93 mmole) of Me$_3$SiOLi in 10 ml of heptane. The D$_3$ was first purified by fractional distillation followed by drying over calcium hydride in a vacuum ampoule at 66° C., wherefrom it was sublimed into the reaction flask. Lithium trimethylsilanolate was synthesized by the reaction of methyl lithium (low halide) with D$_3$ in the ratio of 3 to 1 (mole/mole) in heptane, as described by C.L. Frye et al., J. Org. Chem. 35, 1308 (1970). The lithium trimethylsilanolate was purified by sublimation in a vacuum system and distributed to weighed vials which were sealed off. A solution of the initiator in heptane was prepared by breaking the vial containing silanolate within a vacuum ampoule into which heptane was distilled. Lithium trimethylsilanolate solution was introduced to the reaction flask containing D$_3$ solution by opening the Rotaflo ® stopcock of the vacuum ampoule. The flask contents were maintained at 25° C. and stirred with a magnetic stirrer. The flask was pressurized with argon and the ampoule was replaced with a rubber septum to allow for taking samples of the reaction mixture. The decrease of the D$_3$ concentration was followed by gas chromatography analysis of the samples to monitor the progress of the polymerization. Polymerization was substantially complete after five hours. The capping agent, freshly distilled 3-methacryloxypropyldimethylchlorosilane (Petrarch System) (0.22 g, 1 mmole), was introduced through the septum and the reaction was continued for one hour with additional agitation of the mixture with an ultrasonic bath. The resultant polymer was added to a large excess of methanol, and the separated polymer layer was dissolved in ethyl ether and washed with water. The organic layer was dried with magnesium sulfate, filtered, and evaporated. The resultant polymer did not contain detectable quantities of low molecular weight materials, such as oligomeric siloxanes.

Gel permeation chromatography revealed a number average molecular weight ($\overline{M}_n$) of 23,899 and a weight average molecular weight ($\overline{M}_w$) of 28,347, resulting in a polydispersity of 1.19.

Monomers "C-2a" to "C-2d"

Methacrylate-terminated polydimethylsiloxane polymeric monomers having average molecular weights of about 2,000, 5,000, 13,000, 16,000 and 18,000 were prepared following a procedure similar to that given above for the preparation of Monomer "C-1". For the preparation of these monomers, however, a solution of $D_3$ in a mixture of THF and heptane was prepared on the vacuum line, pressurized with dry argon, and kept in the flask fitted with a rubber septum. A solution of the initiator, lithium trimethylsilanolate, in heptane was prepared on the vacuum line, as described above, for the series of syntheses. The ampoule was pressurized with dry argon.

In detail, 78.26 g of $D_3$ was dissolved in a mixture of 199.5 g of THF and 25.4 g of heptane to give a 38.5 weight % solution of $D_3$. A vial containing 1.2882 g of lithium trimethylsilanolate was broken open in the vacuum ampoule and the silanolate was dissolved in 6.99 g of heptane.

Four 100 ml two-necked flasks each fitted with a condenser, a magnetic stirring bar, and a rubber septum, were oven dried, flushed with argon and placed in the water bath maintained at 25° C.

A weighed amount of $D_3$ solution was introduced into each flask by means of a gas-tight syringe, followed by introduction of a weighed amount of the solution of lithium trimethylsilanolate. Progress of the polymerization was monitored by GC analysis of samples withdrawn from the reaction mixtures. When the degree of conversion of $D_3$ was higher than 95%, a 10 mole % excess of the capping agent, 3-methacryloxypropyl-dimethylchlorosilane was introduced, and the reaction was maintained at 25° C. for one hour. The resultant polymer solutions were poured into an excess of methanol and purified following the procedure given for purification of Monomer "C-1".

Monomer "C-3a"

A methacrylate-terminated polydimethylsiloxane polymeric monomer having an average molecular weight of about 20,000 was prepared using BuLi instead of $Me_3SiOLi$ as the initiator. A flame-dried 1000 ml three-necked flask equipped with a mechanical stirrer, condenser, and septum and purged with dry argon was charged with a dilute solution of $D_3$ (b 1 g) in heptane (100 ml), both freshly dried. 5.5 ml of BuLi (1.7 M in hexane) (9.35 mmoles) was introduced and the initiation reaction was continued overnight at room temperature. 198.7 g (0.89 mole) of $D_3$ in THF (496.8 g) was introduced into the reaction flask via Teflon ® polytetrafluoroethylene (PTFE) tubing and the polymerization was continued for 8 hours with the reaction mixture maintained at room temperature. Progress of the reaction was monitored by GC analysis of the reaction mixture. Thereafter the capping agent, 3-methacryloxypropyl-dimethylchlorosilane (2.26 g, 10.3 mmoles), was introduced and the reaction mixture was stirred for 1 hour, while additionally agitated with an ultrasonic bath which raised the temperature to about 40° C. The resultant polymer solution was poured into an excess of methanol with vigorous stirring. The separated polymer fraction was further purified following the procedure given for purification of Monomer "C-1".

Gel permeation chromatography revealed a number average molecular weight ($\overline{M}_n$) of 23,621 and a weight average molecular weight ($\overline{M}_w$) of 28,193, resulting in a polydispersity of 1.19.

Monomer "C 3b"

A methacrylate-terminated polydimethylsiloxane polymeric monomer having an average molecular weight of about 10,000 was prepared. The procedure was the same as that used to prepare Monomer "C-3a" except that the amounts of lithium initiator, $D_3$ monomer, and the capping agent were selected to produce a polymeric monomer of about half the "C-3a" molecular weight, i.e., 10,000. The monomer produced was analyzed by gel permeation chromatography which gave the following results: $\overline{M}_n = 12,881$, $\overline{M}_w = 14,756$, and polydispersity of 1.14.

Monomer "C-3c"

A methacrylate-terminated polydimethylsiloxane polymeric monomer having an average molecular weight of about 5,000 was prepared. The procedure was the same as that used to prepare Monomer "C-3a" except that the amounts of lithium initiator, $D_3$ monomer, and the capping agent were selected to produce a polymeric monomer of about 5,000. The monomer produced was analyzed by gel permeation chromatography which gave the following result: $\overline{M}_n = 6229$, $\overline{M}_w = 7,116$, and polydispersity of 1.14.

Monomer "C-4"

A styryl-terminated two-armed polydimethylsiloxane polymeric monomer having an average molecular weight of each arm of about 10,000, thus having an average molecular weight of the polymeric monomer of about 20,000, was prepared. An oven-dried 100 ml two-necked flask equipped with a magnetic stirring bar, condenser, and a septum and purged with dry argon was charged with a dilute solution of $D_3$ (0.2 g) (about 1 mmole) in heptane (10 ml). 1.5 ml of s-BuLi (1.32M in cyclohexane) (2.0 mmoles) was introduced and the initiation reaction was continued overnight at room temperature. 20.9 g of $D_3$ (94 mmoles) dissolved in THF (50 g) was introduced into the reaction flask via Teflon ® PTFE tubing and the polymerization was continued for 8 hours with the reaction mixture maintained at room temperature. Progress of the reaction was monitored by GC analysis of the reaction mixture. Thereafter the capping agent, p-vinylphenylmethyldichlorosilane (0.43 g, 0.2 mole), was introduced and the reaction mixture stirred for 1 hour, while additionally agitated with an ultrasonic bath which raised the temperature to about 40° C. The resultant polymer solution was poured into an excess of methanol with vigorous stirring. The separated polymer fraction was further purified following the procedure given for purification of Monomer "C-1".

Gel permeation chromatography revealed a number average molecular weight ($\overline{M}_n$) of 13,381 and a weight average molecular weight ($\overline{M}_w$) of 18,195, resulting in a polydispersity of 1.36.

Monomer "C-5"

A vinylbenzyl-terminated polydimethylsiloxane polymeric monomer having an average molecular weight of about 13,000 was made. The procedure was analogous to that used to prepare Monomer "C-4". $D_3$ (0.2 g) (about 1 mmole) in heptane (10 ml) was introduced into the reaction flask to which 1.5 ml of s-BuLi (1.01M in cyclohexane) (1.52 mmoles) was added, and the initiation reaction was continued overnight at room temperature. 20.9 g of $D_3$ (94 mmoles) dissolved in THF (50 g) was introduced into the reaction flask via Teflon® PTFE tubing and the polymerization was continued for 8 hours with the reaction mixture maintained at room temperature. Progress of the reaction was monitored by GC analysis of the reaction mixture. Thereafter the capping agent, (vinylbenzyl)dimethylchlorosilane (0.23 g, 1.1 mmoles), was added and the reaction mixture was stirred for 1 hour, while additionally agitated with an ultrasonic bath. The resultant polymer solution was poured into an excess of methanol and further purified following the procedure given for purification of Monomer "C-1".

Gel permeation chromatography revealed a number average molecular weight (e,ovs/M/$_n$) of 13,520 and a weight average molecular weight ($\overline{M}_w$) of 16,936, resulting in a polydispersity of 1.25.

Monomer "C-6"

A methacrylate-terminated dimethylsiloxane oligomeric monomer with five silicon atoms, 1-(3-methacryloxypropyl)undecamethylpentasiloxane, was prepared by the reaction of $Me_3SiOLi$ with a stoichiometric amount of $D_3$, followed by capping with 3-methacryloxypropyldimethylchlorosilane. In some instances, $Me_3SiOLi$ was generated in situ in the reaction of MeLi with $D_3$ in a nonpolar solvent, such as n-heptane, prior to introducing a polar solvent.

An oven-dried 100 ml, two-necked flask equipped with a magnetic stirring bar, condenser, and a septum, purged with dry argon was charged with 25 g of THF to which 10.16 g (0.11 mole) of $Me_3SiOLi$ was added, followed by a solution of 23.6 g of $D_3$ (0.11 mole) in 25 g of THF. The reaction was continued for 4 hours at room temperature with the progress of the reaction being monitored by GC analysis of samples withdrawn from the reaction mixture. Thereupon the capping agent, 3-methacryloxypropyldimethylchlorosilane (25.7 g, 0.12 mole), was introduced, and the reaction mixture was stirred for 4 hours at room temperature. The resultant oligomeric monomer was purified by vacuum distillation, b.p. 89° C./1 mm Hg. The purity, as checked by GC, was over 95%.

TABLE II

| "C" Monomer Designation | Initiator | Termination | Molecular Weight | Polydispersity |
|---|---|---|---|---|
| C-1 | $Me_3SiOLi$ | Methacrylate | 24,000 | 1.19 |
| C-2a | $Me_3SiOLi$ | Methacrylate | 2,000 | 1.56 |
| C-2b | $Me_3SiOLi$ | Methacrylate | 6,000 | 1.23 |
| C-2c | $Me_3SiOLi$ | Methacrylate | 15,000 | 1.20 |
| C-2d | $Me_3SiOLi$ | Methacrylate | 18,000 | 1.17 |
| C-3a | n-BuLi | Methacrylate | 24,000 | 1.19 |
| C-3b | n-BuLi | Methacrylate | 13,000 | 1.14 |
| C-3c | n-BuLi | Methacrylate | 6,000 | 1.14 |
| C-4 | s-BuLi | Styryl two-armed | 13,000 | 1.36 |
| C-5 | s-BuLi | Vinylbenzyl | 14,000 | 1.25 |
| C-6 | $Me_3SiOLi$ | Methacrylate | 497 | Pentamer |

EXAMPLE 1

A control adhesive coating composition consisting of a copolymer of 96 parts isooctyl acrylate and 4 parts acrylamide was prepared.

In a glass reaction bottle was placed 19.2 g isooctyl acrylate, 0.8 g acrylamide, 30 g of ethyl acetate, and 0.06 g of 2,2'-azobis(isobutyronitrile) free radical initiator available under the trade designation "VAZO" 64 from the E.I. DuPont Company. The reaction bottle was purged with nitrogen and sealed. It was placed in a 55° C. bath and tumbled therein for 24 hours to produce a polymer which had an inherent viscosity of 1.27 dl/g. The resulting polymer solution was diluted with 50 g ethyl acetate and knife coated onto a 37 micrometer polyester film to provide a dry coating thickness of 25 micrometers. The coated film was equilibrated for 16 hours and thereafter tested under constant temperature and humidity. Test results for immediate peel adhesion to a glass surface are given in Table III.

EXAMPLES 2–4

Adhesive compositions consisting of copolymers of isooctyl acrylate, acrylamide, and varying amounts of methacryloxypropyl-terminated polymeric monomer identified above as "Monomer C-6" were prepared. In a glass reaction bottle, the methacrylate-terminated polymeric monomer (C) was combined with isooctyl acrylate (A), acrylamide (B), 30.0 g of ethyl acetate and 0.06 g initiator ("VAZO" 64). The bottle was purged with nitrogen, sealed, tumbled in a 55° C. water bath for 24 hours and the resulting adhesive compositions coated on a 37 micrometer polyester film to a dry thickness of 25 micrometers and tested yielding the results shown in Table III.

These examples show that the use of a low molecular weight C monomer (MW=497) has a relatively weak effect on the immediate peel adhesion of a pressure sensitive adhesive coating, even at 5% C monomer content.

EXAMPLES 5–7

Monomer "C-2a" (MW 2000), which is more than four times the molecular weight of "C-6" in Examples 2-4, was copolymerized with isooctyl acrylate (A) and acrylamide (B) by the same procedure used in Examples 2–4. These examples show that for compositions containing C monomer with a molecular weight of about 2,000 a decrease in initial peel adhesion relative to the control is observed, and the amount of this decrease is directly related to the amount of C monomer incorporated into the copolymer.

EXAMPLES 8–20

Various copolymer pressure sensitive adhesive compositions were prepared employing the methacryloxypropyl-terminated polymeric monomers C-2b, C-2c, C-2d, and C-1 with isooctyl acrylate (A) and acrylamide (B) as comonomers according to the procedure described in Examples 2-4. Results shown in Table III demonstrate that for a given weight percent of "C" monomer in the copolymer there is a continuing decrease in initial peel adhesion as the molecular weight of the macromonomer is increased from 2000 (C-2a) to 6000 (C-2b) to 15000 (C-2c). Above 15000 a plateau is reached, and peel values for a given weight percent of C monomer are similar, regardless of the monomer's molecular weight. These examples also demonstrate that it is possible to vary the initial peel values of an adhesive coating compostion, within a broad range, simply by varying the "C" monomer content between 0.1 and 5% by weight.

TABLE III

| Ex. No. | Monomers - Parts by Weight | | | | Initial Peel from glass N/100 mm |
|---|---|---|---|---|---|
| | "A" IOA | "B" ACM | "C" | PBW | |
| 1* | 96.0 | 4.0 | none | none | 61.3 |
| 2 | 95.9 | 4.0 | C-6 | 0.1 | 59.3 |
| 3 | 95.0 | 4.0 | C-6 | 1.0 | 52.3 |
| 4 | 91.0 | 4.0 | C-6 | 5.0 | 39.2 |
| 5 | 95.9 | 4.0 | C-2a | 0.1 | 52.6 |
| 6 | 95.0 | 4.0 | C-2a | 1.0 | 30.7 |
| 7 | 91.0 | 4.0 | C-2a | 5.0 | 26.3 |
| 8 | 95.9 | 4.0 | C-2b | 0.1 | 39.4 |
| 9 | 95.0 | 4.0 | C-2b | 1.0 | 27.4 |
| 10 | 91.0 | 4.0 | C-2b | 5.0 | 21.9 |
| 11 | 95.9 | 4.0 | C-2c | 0.1 | 31.3 |
| 12 | 95.0 | 4.0 | C-2c | 1.0 | 28.7 |
| 13 | 91.0 | 4.0 | C-2c | 5.0 | 11.0 |
| 14 | 95.9 | 4.0 | C-2d | 0.1 | 29.8 |
| 15 | 95.0 | 4.0 | C-2d | 1.0 | 25.8 |
| 16 | 91.0 | 4.0 | C-2d | 5.0 | 10.1 |
| 17 | 95.9 | 4.0 | C-1 | 0.1 | 39.5 |
| 18 | 95.5 | 4.0 | C-1 | 0.5 | 31.0 |
| 19 | 95.0 | 4.0 | C-1 | 1.0 | 25.0 |
| 20 | 91.0 | 4.0 | C-1 | 5.0 | 11.0 |

*Control

EXAMPLE 21-25

The coating compositions of Examples 1 and 17-20 were coated on a different backing material, namely 37 micrometer biaxially oriented polypropylene film, to a dry thickness of 25 micrometers, and peel adhesion values were obtained both initially (imm.) and after a dwell time of half an hour (½h) for peeling from glass, from stainless steel: and from polypropylene.

Results presented in Table IV show that a decrease in initial peel adhesion with increasing siloxane content is again observed regardless of the use of the different backing and different substrate surfaces for conducting the peel test. The adhesion is also seen to build with time in each case.

TABLE IV

| Ex. No. | Comp. Ex. No. | Peel Adhesion (N/100 mm) | | | | | |
|---|---|---|---|---|---|---|---|
| | | From glass | | From stainless steel | | From polypropylene | |
| | | imm. | ½ h | imm. | ½ h | imm. | ½ h |
| 21 | 1 | 60.9 | 67.2 | 57.8 | 66.0 | 35.5 | 36.8 |
| 22 | 17 | 39.4 | 47.3 | 40.1 | 48.0 | 12.5 | 25.0 |
| 23 | 18 | 31.1 | 41.4 | 33.9 | 44.0 | 7.7 | 29.6 |
| 24 | 19 | 28.5 | 39.6 | 28.5 | 41.3 | 9.0 | 31.1 |
| 25 | 20 | 18.4 | 32.4 | 13.1 | 30.9 | 4.6 | 22.1 |

EXAMPLE 26

This example and Examples 27-41 demonstrate that the low initial peel adhesion phenomenon can be observed for siliconized adhesive compositions when acrylic acid is used as the reinforcing monomer, B. A control coating composition consisting of a copolymer of 93 parts of isooctyl acrylate and 7 parts acrylic acid was prepared.

In a glass reaction bottle were placed 18.6 g isooctyl acrylate, 1.4 g acrylic acid, 30 g of ethyl acetate, and 0.06 g of 2,2'-azobis(isobutyronitrile) free radical initiator ("VAZO" 64). The reaction was run as in Example 1 to produce a polymer which had an inherent viscosity of 1.24 dl/g. A coating was prepared as in Example 1, and the results of immediate peel and peel after 2 hours dwell time are shown in Table V.

EXAMPLES 27-41

Various copolymer pressure sensitive adhesive compositions were prepared according to the procedure described in Example 26, by employing the methacryloxypropyl-terminated polymeric monomers C-3a, C-3b and C-3c with isooctyl acrylate (A) and acrylic acid (B) as comonomers. Results shown in Table V indicate that the change in reinforcing monomer does not alter the previously observed trend that for a given weight percent of "C" monomer in the copolymer there is a continuing decrease in initial peel adhesion as the molecular weight of the macromer is increased from 6000 (C-3c) to 13000 (C-3b) to 24000 (C-3a). These examples also demonstrate that for the C-3a monomer it is possible to vary the initial peel value of a coating composition over an order of magnitude simply by varying the "C" monomer content between 0.1 and 10.0% by weight. These examples also show that in most cases the peel adhesion value from glass reaches the level of over 70% of the peel adhesion value of the control sample after 2 hours dwell time. The rate of build-up depends both on the molecular weight of the "C" monomer and on its content in the adhesive formulation, as will be demonstrated by further examples shown in Table IX.

TABLE V

| Ex. No. | Monomers - Parts by Weight (PBW) | | | | Peel from Glass N/100 mm | | IV dl/g |
|---|---|---|---|---|---|---|---|
| | IOA PBW | AA PBW | "C" | PBW | imm. | 2 h | |
| 26* | 93.0 | 7.0 | none | none | 74.7 | 92.4 | 1.24 |
| 27 | 92.5 | 7.0 | C-3c | 0.5 | 50.8 | 76.6 | 1.27 |
| 28 | 92.0 | 7.0 | C-3c | 1.0 | 50.0 | 72.7 | 1.24 |
| 29 | 91.0 | 7.0 | C-3c | 2.0 | 50.1 | | 1.29 |
| 30 | 88.0 | 7.0 | C-3c | 5.0 | 45.8 | 76.6 | 1.39 |
| 31 | 83.0 | 7.0 | C-3c | 10.0 | 45.0 | 74.5 | 1.45 |
| 32 | 92.5 | 7.0 | C-3b | 0.5 | 52.8 | 78.6 | 1.18 |
| 33 | 92.0 | 7.0 | C-3b | 1.0 | 45.3 | 77.1 | 1.22 |
| 34 | 91.0 | 7.0 | C-3b | 2.0 | 40.3 | | 1.28 |
| 35 | 88.0 | 7.0 | C-3b | 5.0 | 29.8 | 69.4 | 1.41 |
| 36 | 83.0 | 7.0 | C-3b | 10.0 | 22.3 | 59.1 | 1.77 |
| 37 | 92.5 | 7.0 | C-3a | 0.5 | 57.2 | 75.3 | 1.28 |
| 38 | 92.0 | 7.0 | C-3a | 1.0 | 55.4 | 77.7 | 1.27 |
| 39 | 91.0 | 7.0 | C-3a | 2.0 | 44.4 | | 1.32 |
| 40 | 88.0 | 7.0 | C-3a | 5.0 | 20.6 | 77.3 | 1.58 |
| 41 | 83.0 | 7.0 | C-3a | 10.0 | 4.6 | 62.2 | 1.90 |

*Control

EXAMPLES 42-49

These examples show the effect of variation in the nature and amount of reinforcing monomer, B. Monomer "C-3a" was copolymerized with isooctyl acrylate (A) and various B monomers by the same procedure used in Examples 2-4. Polystyrene macromonomer with a molecular weight of 10,000 was used in some cases as reinforcing monomer, B. This macromonomer was prepared as disclosed in the aforementioned U.S. Pat. Nos. 3,786,116 and 3,842,059 (Milkovich et al.).

Control coating compositions were prepared with similar weight percents of A and B monomers but leaving out the C monomer. The polymer solutions were coated as described for Example 1. Compositions and initial peel values from a glass Panel are given in Table VI. Some previously presented data is alos included for comparison, with reference to the appropriate Example No.

TABLE VI

| Ex. No. | IOA PBW | "B" | PBW | "C" PBW | Initial Peel from glass N/100 mm |
|---|---|---|---|---|---|
| 1 | 96.0 | ACM | 4.0 | none | 61.3 |
| 16 | 91.0 | ACM | 4.0 | 5.0 | 10.1 |
| 26 | 93.0 | AA | 7.0 | none | 74.7 |
| 40 | 88.0 | AA | 7.0 | 5.0 | 20.6 |
| 42 | 90.0 | AA | 10.0 | none | 80.4 |
| 43 | 85.0 | AA | 10.0 | 5.0 | 18.0 |
| 44 | 92.0 | AA PSM | 4.0 4.0 | none | 66.1 |
| 45 | 90.0 | AA PSM | 4.0 4.0 | 2.0 | 7.0 |
| 46 | 96.0 | PSM | 4.0 | none | 42.5 |
| 47 | 91.0 | PSM | 4.0 | 5.0 | 6.5 |
| 48 | 90.0 | NVP | 10.0 | none | 65.9 |
| 49 | 85.0 | NVP | 10.0 | 5.0 | 40.0 |

EXAMPLES 50-53

Theses examples show that different A monomers or a combination thereof can be used. Monomer "C-3a" was coplolymerized with different A monomers and acrylic or methacrylic acid (B) by the same procedure used in Examples 2-4. Control coating compositions were prepared with similar weight percents of A and B monomers but leaving out the C monomer. The polymer solutions were coated as described in Edample 1.

Compositions and initial peel values from a glass panel are given in Table VII.

This invention is not limited to homopolymers of a single A monomer, as copolymers of two or more A monomers can also be used to prepare low initial peel adhesion pressure sensitive adhesive compositions as shown in Examples 52 and 53.

TABLE VII

| Ex. No. | "A" | PBW | "B" | PBW | C-3a PBW | Initial Peel from glass N/100 mm |
|---|---|---|---|---|---|---|
| 50 | IDMA | 96.0 | MMA | 4.0 | none | 15.0 |
| 51 | IDMA | 91.0 | MMA | 4.0 | 5.0 | 6.0 |
| 52 | IOA EA | 60.0 30.0 | AA | 10.0 | none | 45.0 |
| 53 | IOA EA | 56.6 28.4 | AA | 10.0 | 5.0 | 9.0 |

EXAMPLES 54-56

Theses examples show that the copolymerizable head group of the C monomer need not be methacryloxypropyl, and that m in the general formula for the C monomer can be greater than 1.

Isooctyl acrylate (A) and acrylic acid (B) were copolymerized with either monomer C-4 (styryl head group, m=2) or C-5 (vinyl benzyl head group, m=1) by the same procedure used in Examples 2-4. A control coating composition was prepared with 93 parts A monomer and 7 parts B monomer. The polymer solutions were coated as described for Examples 2-4. Compositions and initial peel values are given in Table VIII.

TABLE VIII

| Ex. | IOA (PBW) | AA (PBW) | C Type | (PBW) | Initial Peel from Glass N/100 mm |
|---|---|---|---|---|---|
| 54 | 93.0 | 7.0 | none | none | 75.3 |
| 55 | 88.0 | 7.0 | C-4 | 5.0 | 8.5 |
| 56 | 88.0 | 7.0 | C-5 | 5.0 | 9.8 |

EXAMPLES 57-70

These examples show how the adhesion builds with time at room temperature when an adhesive coated film is left in contact with a glass surface for 1 hour, 2 hours, 5 hours, 1 day, or 2 days. Various copolymer adhesive compositions were prepared employing the methacryloxypropyl-terminated polymeric monomers C-3a, C-3b, and C-3c with isooctyl acrylate (A) and acrylic acid (B) as comonomers according to the procedure described in Examples 2-4. The amount of monomer C was varied within the range 0-20% by weight (in one case 40% by weight of the C monomer was used). A higher concentration of free-radical initiator was used (3.0%) to obtain copolymers with lower inherent viscosities. Compositions, inherent viscosities, initial peel values, and peel values after 1 hour, 2 hours, 5 hours, 24 hours, and 48 hours dwell time are given in Table IX. These results show that low initial peel values can be observed for siliconized copolymers of lower inherent viscosity (more compliant adhesive) and that by increasing the content of C monomer in the range 5-20% by weight a further decrease of the initial peel values can be obtained, particularly with the C-3a monomer. The rate of build-up of peel adhesion strongly depends on both the molecular weight of the C monomer and on its weight percentage, and this rate is faster in building to the level of the control for compositions containing a lower percentage of lower molecular weight C monomer (5000). In most cases the peel adhesion level reaches 80% of the peel value of the control coating within 1 or 2 hours.

TABLE IX

| Ex. No. | IOA PBW | AA PBW | "C" | PBW | imm. | 1 h | 2 h | 5 h | 24 h | 48 h | I.V. dl/g |
|---|---|---|---|---|---|---|---|---|---|---|---|
| 57* | 93.0 | 7.0 | none | none | 74.5 | 75.3 | 78.3 | 77.1 | 75.5 | 77.3 | 0.80 |
| 58 | 92.0 | 7.0 | C-3c | 1.0 | 46.4 | 60.0 | 63.5 | 63.7 | 69.2 | 73.4 | 0.78 |
| 59 | 88.0 | 7.0 | C-3c | 5.0 | 43.4 | 59.3 | 63.5 | 64.6 | 72.7 | 73.8 | 0.80 |
| 60 | 83.0 | 7.0 | C-3c | 10.0 | 44.8 | 62.2 | 62.8 | 66.1 | 72.7 | 75.3 | 0.82 |
| 61 | 73.0 | 7.0 | C-3c | 20.0 | 48.8 | 66.8 | 70.0 | 70.0 | 77.7 | 79.9 | 0.89 |
| 62 | 92.0 | 7.0 | C-3b | 1.0 | 46.9 | 64.4 | 65.5 | 65.5 | 73.8 | 79.4 | 0.79 |
| 63 | 88.0 | 7.0 | C-3b | 5.0 | 36.1 | 59.3 | 62.6 | 65.9 | 71.3 | 75.7 | 0.80 |
| 64 | 83.0 | 7.0 | C-3b | 10.0 | 31.1 | 57.0 | 60.4 | 62.8 | 76.4 | 80.5 | 0.90 |
| 65 | 73.0 | 7.0 | C-3b | 20.0 | 29.8 | 50.6 | 55.2 | 58.9 | 72.3 | 77.3 | 1.20 |
| 66 | 92.0 | 7.0 | C-3a | 1.0 | 47.5 | 65.0 | 65.9 | 68.1 | 75.1 | 73.8 | 0.78 |
| 67 | 88.0 | 7.0 | C-3a | 5.0 | 15.1 | 56.9 | 61.3 | 63.3 | 63.6 | 80.6 | 0.91 |

TABLE IX-continued

| Ex. No. | Monomers - Parts by Weight | | | | Peel From Glass N/100 mm | | | | | | I.V. dl/g |
|---|---|---|---|---|---|---|---|---|---|---|---|
| | IOA PBW | AA PBW | "C" | PBW | imm. | 1 h | 2 h | 5 h | 24 h | 48 h | |
| 68 | 83.0 | 7.0 | C-3a | 10.0 | 14.9 | 57.8 | 60.4 | 63.3 | 68.0 | 81.0 | 1.00 |
| 69 | 73.0 | 7.0 | C-3a | 20.0 | 8.0 | 29.8 | 35.2 | 46.4 | 57.1 | 64.6 | 1.30 |
| 70 | 53.0 | 7.0 | C-3a | 40.0 | 4.6 | | 7.9 | | | | |

*Control

EXAMPLES 71 AND 72

These examples demonstrate the option of tackification of the coating compositions, which is desirable in applications where higher peel adhesion is required.

To the copolymer solutions from Examples 26 and 40 was added 20 parts by weight of solids of a rosin ester tackifying resin available under the trade designation FORAL 85, made by Hercules Inc. The resulting solutions were coated onto polyester film and tested as described in Example 1.

The results demonstrate that a very strong decrease of the initial peel of an aggressive tackified adhesive can be obtained by the method of this invention.

| Ex. No. | Composition as in Ex. | PBW | Tackifier | PBW | Peel from Glass (N/100 mm) | |
|---|---|---|---|---|---|---|
| | | | | | imm. | 2 h |
| 26 | | 100 | none | | 74.7 | 92.4 |
| 40 | | 100 | none | | 20.6 | 77.3 |
| 71 | 26 | 80.0 | FORAL 85 | 20.0 | 75.0 | 91.5 |
| 72 | 40 | 80.0 | FORAL 85 | 20.0 | 15.3 | 62.0 |

EXAMPLES 73–79

These examples demonstrate the effect of the C monomer on self-adhesiveness of the adhesive coatings.

Adhesive coatings prepared as in Examples 57, 60-61, 64-65, and 68-69 were tested for self-adhesiveness, as described in the section on Test Methods. The results shown in Table X demonstrate a very useful property of non-self-adhesiveness in the case of siliconized adhesive coatings. The peel data for the samples which were reapplied after being peeled following 3 hours dwell shows that the low adhesion frontsize formed by the siloxane grafts can easily reappear on the polymer coating-air interface. In all cases, on 24 hours dwell a strong adhesion bond between the polymer coatings is built.

TABLE X

| Ex. No. | Monomers - Parts by Weight | | | | Peel Adhesion (N/100 mm) | | | |
|---|---|---|---|---|---|---|---|---|
| | IOA PBW | AA PBW | "C" | PBW | Imm. | 3 h | reapplied | 24 h |
| 73* | 93.0 | 7.0 | none | none | 76.9 | 82.3 | 43.6 | 91.1 |
| 74 | 83.0 | 7.0 | C-3c | 10.0 | 44.4 | 54.5 | 30.2 | 81.7 |
| 75 | 73.0 | 7.0 | C-3c | 20.0 | 13.8 | 55.8 | 24.7 | 89.1 |
| 76 | 83.0 | 7.0 | C-3b | 10.0 | 14.2 | 40.3 | 12.9 | 37.9 |
| 77 | 73.0 | 7.0 | C-3b | 20.0 | 11.8 | 35.5 | 10.3 | 39.6 |
| 78 | 83.0 | 7.0 | C-3a | 10.0 | 9.6 | 47.1 | 19.0 | 40.9 |
| 79 | 73.0 | 7.0 | C-3a | 20.0 | 10.5 | 12.7 | 8.1 | 49.3 |

*Control

EXAMPLES 80–82

Four parts of the polymer from Example 26 (containing no C-monomer) were mixed with one part of the polymer from Examples 30, 35 and 40 (containing 5% by weight of monomer C-3c, C-3b and C-3a, respectively) to give a compatible blend with an effective concentration of 1% by weight of monomer C. This was coated onto a 37 micrometer polyester film. Peel values of the resulting films were investigated and the results are presented in Table XI. Peel values of the blend components are also included. These examples show that for a compatible blend of a copolymer containing no C monomer with a copolymer containing a relatively high percentage of C monomer an effective decrease of the initial peel can be achieved with the low effective concentration of siloxane macromer in the blend. This suggests an enrichment of siliconized adhesive composition close to the polymer-air interface.

TABLE XI

| Ex. No. | Blend Components | | | | | | Initial Peel from Glass N/100 mm |
|---|---|---|---|---|---|---|---|
| | Control Adhesive Ex. No. | PBW | Siliconized Adhesive Ex. No. | PBW | "C" | PBW | |
| 26 | 26 | 100 | none | | none | | 74.7 |
| 30 | none | | 30 | 100 | C-3c | 5.0 | 45.8 |
| 35 | none | | 35 | 100 | C-3b | 5.0 | 29.8 |
| 40 | none | | 40 | 100 | C-3a | 5.0 | 20.6 |
| 80 | 26 | 80.0 | 30 | 20.0 | C-3c | 1.0 | 48.2 |
| 81 | 26 | 80.0 | 35 | 20.0 | C-3b | 1.0 | 31.0 |
| 82 | 26 | 80.0 | 40 | 20.0 | C-3a | 1.0 | 24.7 |

EXAMPLES 83–84

These examples demonstrate that the same phenomenon of decreased initial peel adhesion can be observed for coatings of crosslinked adhesives. Adhesive compositions as in Examples 57 and 67 were mixed with 0.5 weight % benzophenone, coated on polyester film and crosslinked by UV irradiation. The results of the initial peel adhesion from glass and the peel after 2 hours dwell time are shown below.

| Ex. No. | Adhesive Ex. No. | "C" PBW | Peel (N/100 mm) | |
|---|---|---|---|---|
| | | | imm. | 2 h |
| 83 | 57 | none | 65.9 | 65.5 |

| Ex. No. | Adhesive Ex. No. | "C" PBW | Peel (N/100 mm) imm. | 2 h |
|---|---|---|---|---|
| 84 | 67 | 5.0 | 11.2 | 54.3 |

While this invention has been described in terms of specific embodiments, it should be understood that it is capable of further modification. The claims herein are intended to cover those variations which one skilled in the art would recognize as the chemical equivalent of what has been described here.

I claim:

1. A pressure sensitive adhesive composition comprising:
(a) a copolymer which has a vinyl polymeric backbone having grafted to it monovalent siloxane polymeric moieties, said copolymer comprising A, C, and, optionally, B monomers wherein:
A is at least one free radically polymerizable vinyl monomer;
B, when used, is at least one reinforcing monomer copolymerizable with A, the amount by weight of B monomer being up to about 20% of the total weight of all monomers in said copolymer, said B monomer being selected from the group consisting of polar monomers and macromers having a $T_g$ or a $T_m$ above about 20° C.; and
C is a polymeric monomer having the general formula $$X(Y)_nSi(R)_{3-m}Z_m$$

wherein:
The amount and composition of C monomer in the copolymer is such as to provide said pressure sensitive adhesive composition with a decrease in initial peel adhesion value relative to that of an adhesive composition comprising a polymer of A and B, if used, without C and in the same relative amounts of A and B, if used, and of substantially the same molecular weight;
X is a vinyl group copolymerizable with the A and B monomers;
Y is a divalent linking group;
R is a hydrogen, lower alkyl, aryl, or alkoxy;
Z is a monovalent siloxane polymeric moiety having a number average molecular weight of at least about 500 and is essentially unreactive under copolymerization conditions and is pendant from said vinyl polymeric backbone;
n is zero or one;
m is an integer of from one to three
(b) up to about 150 parts by weight compatible tackifying resin per 100 parts copolymer; and
(c) up to about 50 parts by weight of compatible plasticizer per 100 parts copolymer,
said adhesive composition having a peel adhesion value which is lower initially when an exposed surface of said adhesive composition is first applied to a substrate but which builds with time once applied to approach the peel adhesion value of the adhesive composition without C.

2. The pressure sensitive adhesive composition of claim 1 wherein at least one of said A monomers is an acrylic or methacrylic acid ester of a non-tertiary alcohol having from 1 to 18 carbon atoms with the average number of carbon atoms being about 4 to 12.

3. The pressure sensitive adhesive composition of claim 2 wherein the average number of carbon atoms is about 6 to 10.

4. The pressure sensitive adhesive composition of claim 1 wherein said B is selected from the group consisting of acrylic acid, methacrylic acid, itaconic acid, acrylamide, methacrylamide, N,N-dimethylacrylamide, acrylonitrile, methacrylonitrile, N-vinyl pyrrolidone, and macromonomers having a $T_g$ or $T_m$ above about 20° C.

5. The pressure sensitive adhesive composition of claim 1 wherein said B monomer is selected from the group consisting of acrylic acid, acrylamide, methacrylic acid, N-vinyl pyrrolidone, acrylonitrile, and poly(styrene) macromonomer.

6. The pressure sensitive adhesive composition of claim 1 wherein said B monomer comprises about 2% to about 15% by weight of all monomers in said copolymer.

7. The pressure sensitive adhesive composition of claim 1 wherein said X group of said C monomer has the general formula

wherein $R^1$ is hydrogen or a COOH group and $R^2$ is hydrogen, a methyl group, or a $CH_2COOH$ group.

8. The pressure sensitive adhesive composition of claim 1 wherein said Z group of said C monomer has the general formula

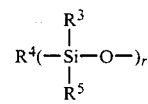

wherein
$R^3$ and $R^5$ are independently lower alkyl, aryl, or fluoroalkyl;
$R^4$ is alkyl, alkoxy, alkylamino, aryl, hydroxyl, or fluoroalkyl; and
r is an integer from about 5 to about 700.

9. The pressure sensitive adhesive composition of claim 1 wherein said C monomer has a general formula selected from the group consisting of

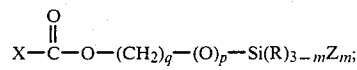  (a)

  (b)

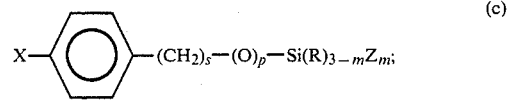  (c)

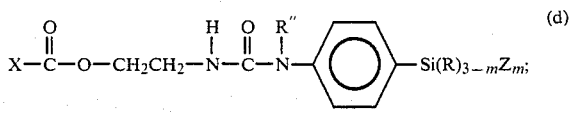  (d)

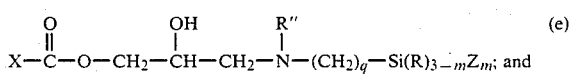  (e)

-continued

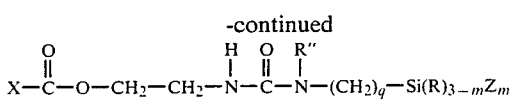

wherein

R" is alkyl or hydrogen;
m is 1, 2 or 3;
p is zero or 1;
q is an integer from 2 to 6;
s is an integer from 0 to 2.

10. The pressure sensitive adhesive composition of claim 1 wherein the molecular weight of said C monomer is in the range of about 500 to about 50,000.

11. The pressure sensitive adhesive composition of claim 1 wherein the molecular weight of said C monomer is in the range of about 5,000 to about 25,000.

12. The pressure sensitive adhesive composition of claim 1 wherein the amount by weight of said C monomer is within the range of about 0.01 to about 50% of the total monomer weight in said copolymer.

13. The pressure sensitive adhesive composition of claim 1 wherein the amount by weight of said B plus C monomers is within the range of about 0.01 to about 70% of the total weight of all monomers in said copolymer.

14. The pressure sensitive adhesive composition of claim 1 in the form of a film.

15. The film of claim 14 being borne on at least one release liner.

16. A pressure sensitive adhesive coated sheet material comprising a backing sheet at least partially coated on at least one major surface with the pressure sensitive adhesive composition of claim 1.

17. The sheet material of claim 16 wherein said backing is selected from the group consisting of paper, film-forming polymer, woven fabric, ceramic, metal, non-woven fabric, and metallized polymeric film.

18. A pressure sensitive adhesive coated tape comprising an elongate backing being coated on at least one surface with the pressure sensitive adhesive composition of claim 1.

19. The tape of 18 in roll form.

20. A pressure sensitive adhesive blend comprising the pressure sensitive adhesive composition of claim 1 and a different pressure sensitive adhesive composition which does not have grafted polysiloxane moieties 21. The pressure-sensitive adhesive of claim 1 further characterized by being crosslinked.

* * * * *

UNITED STATES PATENT AND TRADEMARK OFFICE
CERTIFICATE OF CORRECTION

PATENT NO. : 4,693,935

DATED : September 15, 1987

INVENTOR(S) : Mazurek

It is certified that error appears in the above-identified patent and that said Letters Patent is hereby corrected as shown below:

Column 3, line 50, delete "patent application" and insert in its place --Pat. Application--.

Column 5, line 7, the segment beginning with the word "wherein" should start on a new line.

Column 9, line 32, after "defined" insert --and where r is an--.

Column 11, line 67, delete "$(e,ovs/M/_w)$" and insert in its place --$(\overline{M}_w)$--.

Column 12, lines 4-5, delete "$(\overline{M}_w/e,ovs/M/_n)$" and insert in its place --$\overline{M}_w/\overline{M}_n$--.

Column 13, line 54, delete "10hu 5 $\overset{\bullet}{A}$" and insert in its place --$10^5 \overset{\bullet}{A}$--.

Column 15, line 58, delete "(b 1 g)" and insert in its place --(1 g)--.

Column 16, line 14, delete ""C 3b"" and insert in its place --"C-3b"--.

Column 17, line 27, delete "$(e,ovs/M/_n)$" and insert in its place --$(\overline{M}_n)$--.

Column 19, line 44, after the word "steel", delete ":" and insert in its place --,--.

Column 21, line 5, delete "Panel" and insert in its place --panel--.

UNITED STATES PATENT AND TRADEMARK OFFICE
CERTIFICATE OF CORRECTION

PATENT NO. : 4,693,935

DATED : September 15, 1987

INVENTOR(S) : Mazurek

It is certified that error appears in the above-identified patent and that said Letters Patent is hereby corrected as shown below:

Column 21, line 6, delete "alos" and insert in its place --also--.

Column 21, line 35, delete "Edample" and insert in its place --Example--.

Signed and Sealed this

Twenty-second Day of November, 1988

Attest:

DONALD J. QUIGG

*Attesting Officer*   *Commissioner of Patents and Trademarks*